United States Patent [19]

Johnson

[11] Patent Number: 4,946,331
[45] Date of Patent: Aug. 7, 1990

[54] DISCHARGE CONTROL APPARATUS FOR COTTON CART BASKET

[76] Inventor: Mark L. Johnson, 114 Spruce, Mt. Park, Okla. 73559

[21] Appl. No.: 318,232

[22] Filed: Mar. 3, 1989

[51] Int. Cl.⁵ ............................................. B65B 69/00
[52] U.S. Cl. ..................................... 414/421; 414/425; 414/470; 414/492; 298/18
[58] Field of Search ............... 414/470, 492, 417, 419, 414/425, 421, 517; 298/8 H, 10, 11, 18, 22 R; 100/100, 218

[56] References Cited

U.S. PATENT DOCUMENTS

| | | | |
|---|---|---|---|
| Re. 27,997 | 4/1974 | Knight | 214/508 |
| Re. 28,980 | 9/1976 | Mackenzie | 214/38 D |
| 2,256,453 | 9/1941 | Bomar | 214/113 |
| 2,619,241 | 11/1952 | Jessen | 214/65 |
| 2,993,610 | 7/1961 | Kughler | 214/514 |
| 3,035,724 | 5/1962 | Clark et al. | 214/140 |
| 3,458,067 | 7/1969 | Irwin | 414/517 |
| 3,610,485 | 10/1971 | Van Raden | 298/8 H X |
| 3,709,389 | 1/1973 | Steltz | 214/82 |
| 3,753,593 | 8/1973 | Wells et al. | 414/470 X |
| 3,779,405 | 12/1973 | Kavanaugh, Jr. | 414/421 X |
| 3,965,660 | 6/1976 | Kanengieter et al. | 100/218 X |
| 4,049,137 | 9/1977 | Meyer | 414/517 X |
| 4,415,302 | 11/1983 | Brouwer et al. | 414/417 |
| 4,458,588 | 7/1984 | Steele | 100/100 |

FOREIGN PATENT DOCUMENTS

| | | | |
|---|---|---|---|
| 0372722 | 3/1923 | Fed. Rep. of Germany | 414/470 |
| 0020512 | 2/1979 | Japan | 414/517 |

Primary Examiner—David A. Bucci
Assistant Examiner—James R. Bidwell
Attorney, Agent, or Firm—Dunlap, Codding, Peterson & Lee

[57] ABSTRACT

A cotton cart with a discharge control apparatus in the basket is provided. A tray-shaped member is mounted in the basket for movement between a retracted position and a discharge position. The member is supported by a system of links so that the member pivots about a moving pivot point. As a result, the leading edge of the member follows an eccentrically arced path which conforms substantially to the inner contour of the basket to facilitate evacuation of the basket. The member is operated by a hydraulic cylinder, thereby enabling the operator to manipulate the cotton bolls during the discharge procedure.

12 Claims, 3 Drawing Sheets

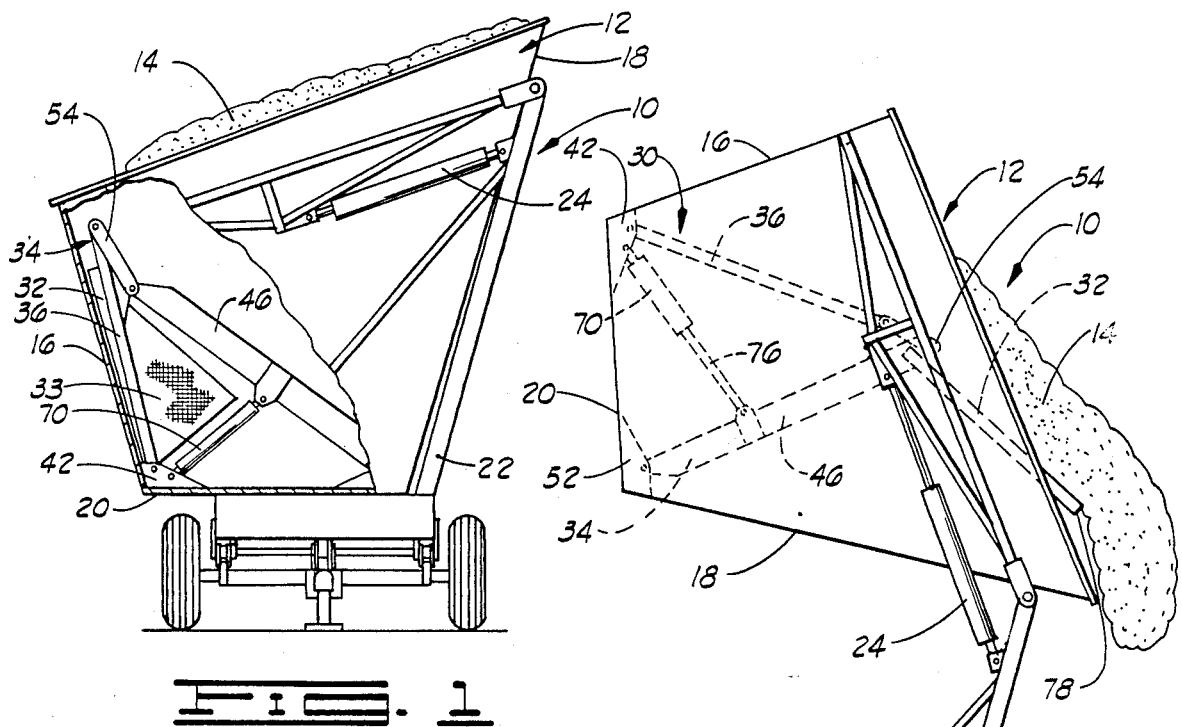
FIG. 1
FIG. 2
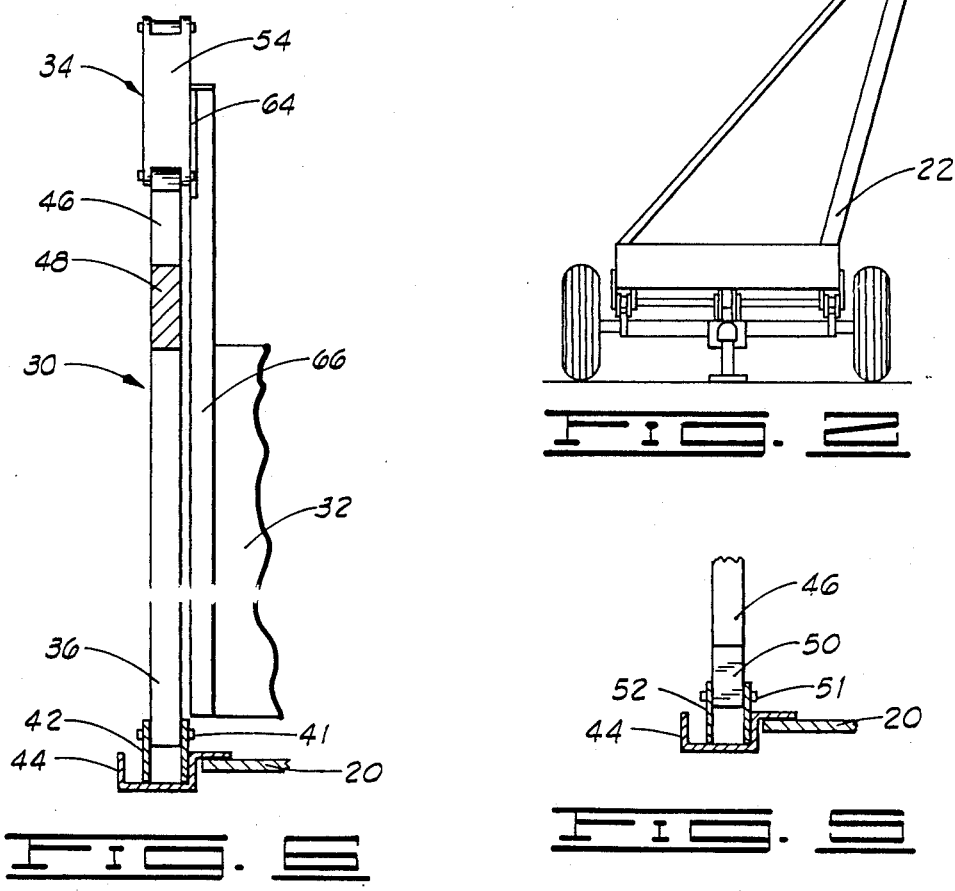
FIG. 3
FIG. 5

DISCHARGE CONTROL APPARATUS FOR COTTON CART BASKET

FIELD OF THE INVENTION

The present invention relates generally to cotton carts, and in particular to devices for controlling the discharge of a load of cotton bolls from the basket of a cotton cart.

SUMMARY OF THE INVENTION

The present invention comprises a discharge control apparatus for the basket of a cotton cart and for other containers adapted for receiving and discharging a load of material in which similar difficulties are encountered. The apparatus comprises a discharge control member having a leading edge. The member is supported within the basket or container for reciprocal movement between a retracted position and an extended position so that the leading edge of the member follows an eccentrically arced path which generally conforms to the inner contour of the basket or container. The apparatus includes means for controlling the movement of the discharge control member.

The present invention further comprises a cotton cart which comprises a basket for receiving a load of cotton bolls and in which a discharge control apparatus as described above is installed. The basket of the cotton cart is supported on a frame, and means is included on the frame for reciprocally moving the basket between an intake position in which the basket rests upright on the frame and a discharge position in which the basket is upended.

BRIEF DESCRIPTION OF THE DRAWINGS

FIG. 1 is an end elevational view of a cotton cart. The end wall of the basket is partly broken away to show a discharge control apparatus installed therein in accordance with the present invention.

FIG. 2 is an end view of the cotton cart shown in FIG. 1 with the basket elevated to the discharge position and the discharge control apparatus is in the extended position.

FIG. 5 is a sectional view taken along line 5—5 of FIG. 4.

FIG. 6 is a sectional view taken along line 6—6 of FIG. 4.

FIG. 7 is a further enlarged view of the basket as shown in FIG. 3 and showing the paths of the several pivoting components of the apparatus.

DETAILED DESCRIPTION OF THE PREFERRED EMBODIMENT

Figure 3:
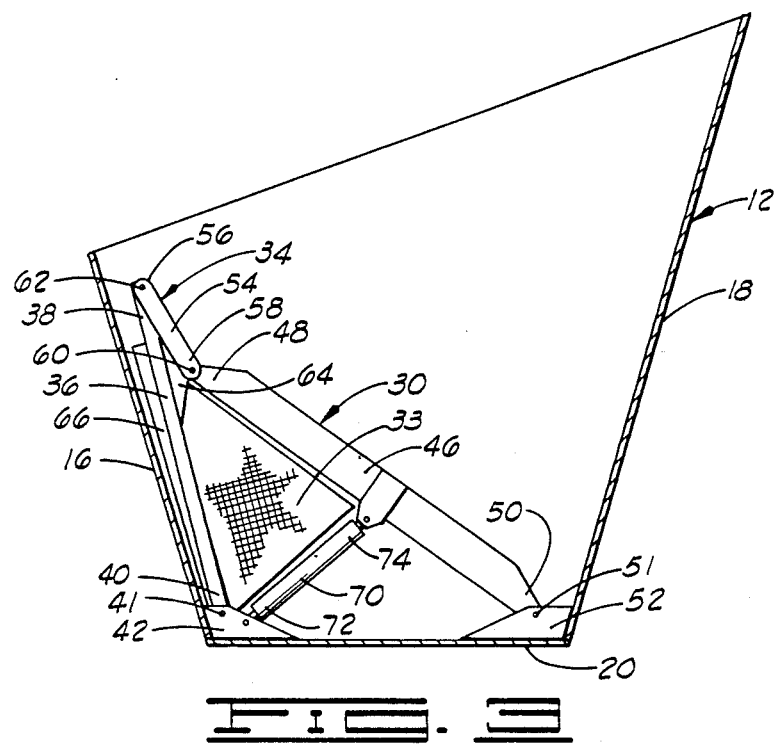
FIG. 3 is an enlarged end view of the basket with the end wall removed illustrating the discharge control apparatus in the retracted position.

In modern cotton farming, cotton is harvested by a picker machine which travels through the cotton field. A cotton cart drives to the loaded picker and receives a load of harvested cotton. The cotton cart then drives to a module builder located typically at the edge of the field some distance away.

Most module builders have a capacity equal to about 3-4 full loads from a cotton cart, but this varies substantially. The first two loads from the cotton cart are received comfortably in the module builder, but with the third or fourth load, the module builder becomes so full that there is room left only for a partial load from the cart. If the module builder is left only partially filled, the modules produced are smaller and more trips then are required between the field and the gin. It therefore is advantageous to maximize the volume of cotton deposited in a module builder before it is emptied. This is best accomplished by controlling the amount of cotton which is discharged by the cart as the module builder approaches its maximum capacity.

The present invention meets this need by providing a discharge control apparatus in the basket of the cart. This apparatus permits the operator to discharge a variable amount of the basket's load so that the module builder can be topped off.

The apparatus operates between a retracted position and an extended position. In the retracted position, the apparatus is collapsed against the side of the basket and permits full use of the basket volume. Thus, the cart may be operated in the normal manner without using the apparatus when the module builder has ample room for a full load. When the module builder is nearly full, the apparatus may be employed to dispense only as much of its load as required to top off the module builder.

The apparatus of this invention has relatively few moving parts. Thus, manufacture of the apparatus and carts comprising the apparatus is simplified. Likewise, repair and maintenance are minimized.

Referring now to the figures in general and in particular to FIG. 1, shown therein and designated by the reference numeral 10 is a cotton cart constructed in accordance with the present invention. The cart 10 comprises a basket 12 for receiving a load of harvested cotton bolls 14.

The basket 12 has a shorter intake side wall 16 and longer discharge side wall 18, both of which extend outwardly and upwardly from the bottom 20 of the cart 12. With this configuration the cart is well suited to receive a load of harvested cotton balls from a picker adjacent the intake side wall 16 for subsequent discharge in a manner to be described.

The basket 12 is supported on a frame 22, which preferably is movable. Typically, hydraulic cylinders 24 are employed for reciprocally moving the basket between an intake position and a discharge position. In the intake position, as shown in FIG. 1, the basket 12 rests upright on the frame 22.

Upon operation of the hydraulic cylinder 24, the basket 12 is lifted and upended (FIG. 2) so that the load of cotton bolls 14 may be discharged into the bin of an adjacent module builder or other receptacle (not shown). The basket 12 preferably is upended to a point where the discharge side wall 18 is declined slightly toward the bin. In this way, the discharge side wall 18 serves as a ramp which guides the load into the bin assisted to some extent by gravity.

Figure 4:
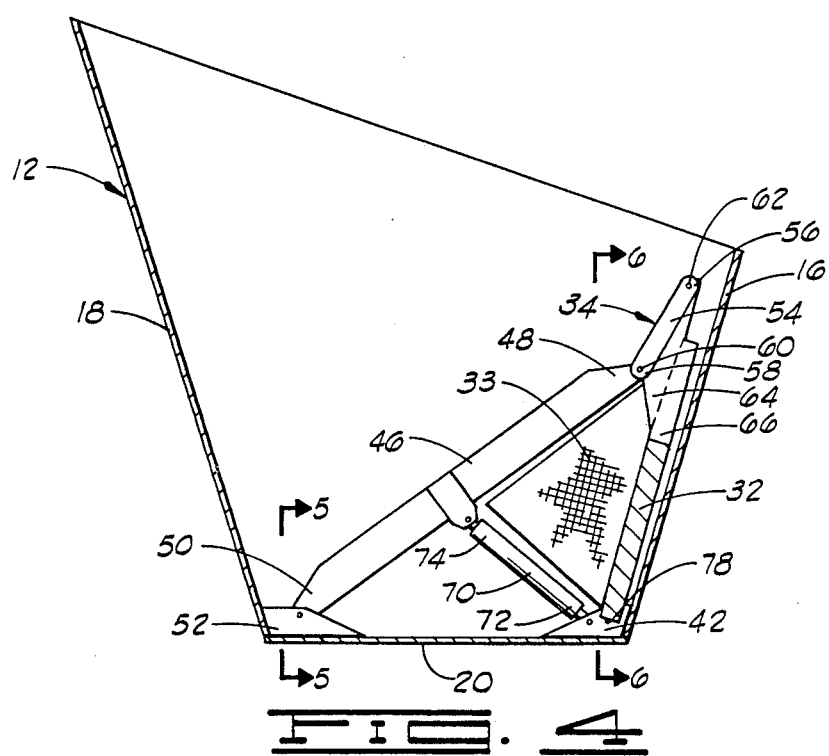
FIG. 4 is an enlarged vertical cross-sectional view of the basket showing the discharge control apparatus from the inside.
Figure 3:
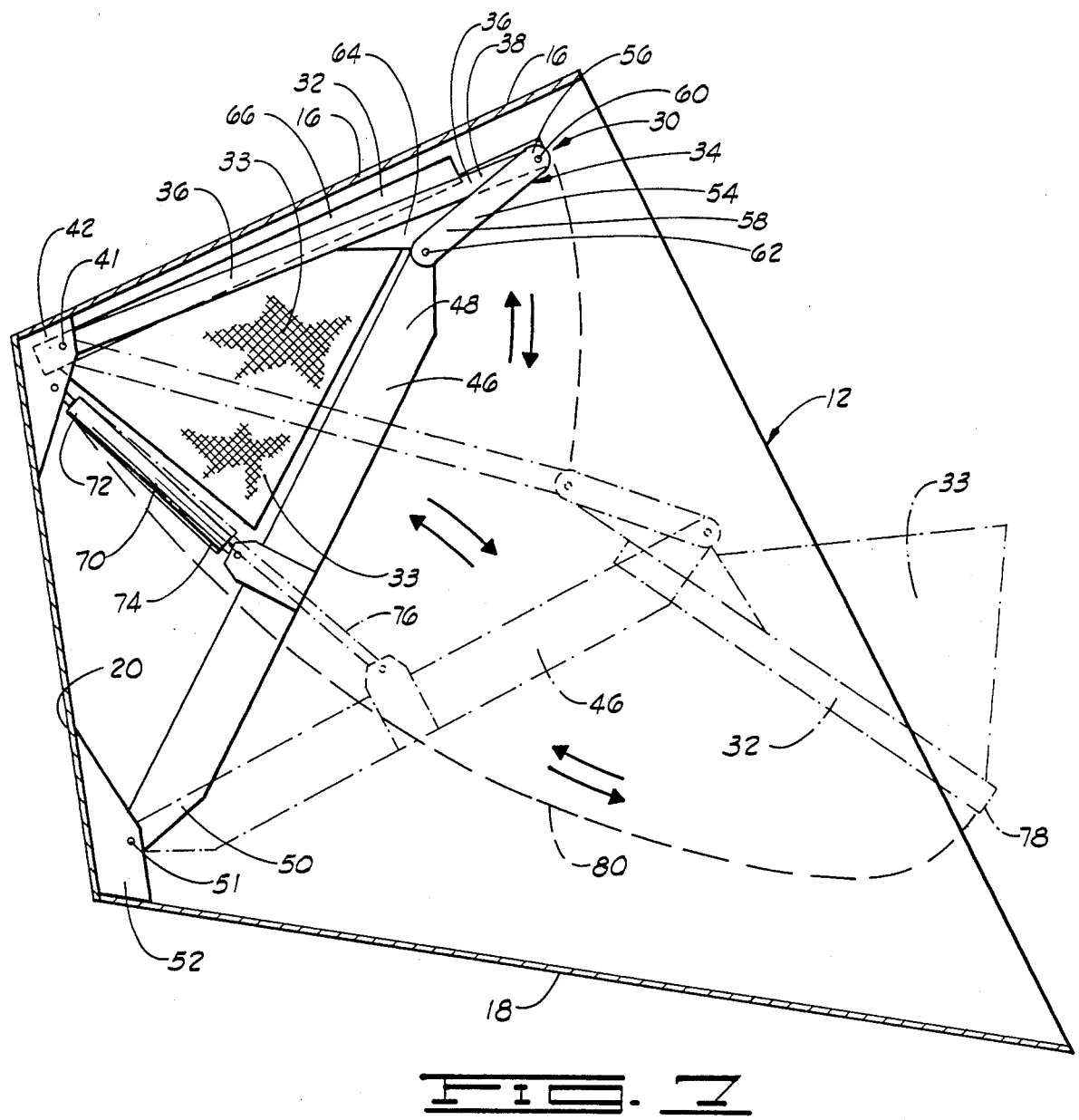

With reference next to FIGS. 3 and 4, the cotton cart 10 is provided with a discharge control apparatus 30 for controlled evacuation of the basket 12. The apparatus 30 comprises a discharge control member 32 (FIG. 4), preferably in the form of a tray or panel as shown which extends end to end inside the basket 12.

The discharge control member 32 may be provided with wing-like side extensions 33 so that the member will effectively scoop or cradle the load of cotton bolls as they are discharged from the basket. These extensions prevent small clumps of bolls from falling behind the member 32 as it moves through the basket. In particular, the extensions 33 prevent clumps of bolls from becoming wedged between the operating components of the assembly which supports the member.

The discharge control member 32 is movably supported in the basket 12 by a link assembly 34. Only one link assembly is shown and described herein, but it will be understood that in most instances the member 32 will be supported between a pair of such assemblies.

The link assembly 34 comprises an intake side link 36 having an upper end 38 and a lower end 40. The lower end 40 is pivotally connected to the basket 12 for pivotation about a fixed pivot point 41 at about the junction of the bottom 20 and the intake side wall 16. As shown in FIG. 5, the end 40 of the link 36 may be mounted between a pair of pivot supports 42 fixed in a channeled member 44 forming the endframe of the bottom 20 of the basket 12.

The link assembly 34 further comprises a discharge side link 46 having an upper end 48 and a lower end 50. The lower end 50 is pivotally connected to the basket 12 for pivotation about a fixed pivot point 51 at about the junction of the bottom 20 and the discharge side wall 18. As shown in FIG. 6, the end 50 of the link 46 may be mounted between a pair of pivot supports 52 fixed in the channeled member 44 opposite the pivot supports 42.

A connecting link 54 having a first end 56 and second end 58 interconnects the upper ends 38 and 48 of the intake side link 36 and the discharge side link 46. These connections also are pivotal and provide pivotation about two moving pivot points, one pivot point 60 between the first end 56 of the connecting links 54 and the upper end 38 of the intake side line 36, and second pivot point 62 between the second end 58 of the connecting link 54 and the upper end 48 of the discharge side link 46.

As best shown in FIG. 4, a support 64 depends from the connecting link 54 and is rigidly fixed to an endframe 66 on which the discharge control member 32 is attached. Thus constructed, the connecting link 54, the support 64 and the discharge control member 32 depending therefrom being rigidly interconnected operate as a single component which pivots about the moving pivot points 60 and 62. Supported thusly, the member 32 is movable between a retracted position (FIGS. 3 and 4) and an extended position (FIG. 2).

For controlling the movement of the discharge control member 32, a hydraulic cylinder 70 is included. One end 72 of the cylinder 70 is pivotally connected to the pivot supports 42 near the pivot point 41 where the intake side link 36 attaches. The other end 74 of the cylinder 70 is pivotally connected about midway along the length of the discharge side link 46. When the rod 76 (FIG. 2) of the cylinder extends, the link 46 is pushed toward the discharge side wall 18 moving the member 32 towards the extended position. When the rod 76 is retracted, the member 32 is returned to the retracted position.

Turning now to FIG. 7, it will be appreciated that because the discharge control member 32 is pivoting about the moving pivot points 60 and 62, and because of the relative lengths of the links 36 and 46, the leading edge 78 of the member 32 follows an eccentrically arced path 80 as it moves between the retracted position, indicated by the solid lines, and the extended position indicated by dot-dash lines. This path substantially conforms to the inner contour of the basket 12.

As used herein, "substantially conforms" denotes a degree of conformance between the leading edge of the member and the contour of the basket which permits the member to evacuate a portion of the material in the basket or container. The degree of conformance depicted herein is selected based on the nature and consistency of freshly harvested cotton bolls which agglomerate into large clumps. However, as indicated, the apparatus may be modified to provide a closer conformance where appropriate.

The operation of a cotton cart equipped with the apparatus of this invention is best understood by viewing FIG. 7. In this Figure the basket 12 is shown in the upended or discharge position (also depicted in FIG. 2). Once the basket 12 is positioned so, the hydraulic cylinder 70 is operated to cause the member 32 to move downward and forward along the path 80. This pushes the load of cotton bolls forward and out of the basket 12 into the waiting bin. The speed of the movement of the member 32 should be controlled so as to provide relatively smooth evacuation of the basket 12. This provides rapid emptying and yet maintains the load in a compacted state.

Because the relative lengths of the links 36, 46 and 54, in cooperation with the distance between the fixed pivot points 41 and 51, control the path 80 of the discharge control member 32, it will be understood that these dimensions may be adjusted to provide a discharge control apparatus for cotton cart baskets having different shapes and dimensions from those shown herein. It further will be appreciated that the application of the present invention is not limited to use in cotton cart baskets. Rather, in accordance with the present invention, a discharge control apparatus may be provided for containers of other kinds which are adapted for receiving and discharging material and in which similar difficulties in efficient discharge are experienced.

Changes may be made in the combination and arrangement of the various parts, elements, steps and procedures described herein without departing from the spirit and scope of the invention as defined in the following claims.

What is claimed is:

1. A discharge control apparatus for the basket of a cotton cart, comprising:
   a discharge control member having a leading edge and being reciprocally supported within the basket for movement between a retracted position and an extended position so that the leading edge of the member follows an eccentrically arced path which generally conforms to the inner contour of the basket; and
   means for controlling the movement of the discharge control member;
   wherein the basket has a bottom, an intake side wall and a discharge side wall, and wherein the discharge control member is supported by a link assembly comprising:
      an intake side link having an upper end and a lower end, the lower end being pivotally connected at a fixed point to the basket at the junction of the bottom and the intake side wall;
      a discharge side link having an upper end and a lower end, the lower end being pivotally connected at a fixed point to the basket at the junction of the bottom and the discharge side wall;

a connecting link having a first end and a second end, the first end being pivotally connected to the upper end of the intake side link and the second end being pivotally connected to the upper end of the discharge side link; and a support depending from the connecting link on which the discharge control member is fixed.

2. The discharge control apparatus of claim 1, wherein the bottom, the intake side wall and the discharge side wall of the basket are non-movably related.

3. The discharge control apparatus of claim 2 wherein the discharge control member is non-movably fixed to the support and the support is non-movably related to the connecting link.

4. The discharge control apparatus of claim 1 wherein the discharge control member is non-movably fixed to the support and the support is non-movably related to the connecting link.

5. A cotton cart, comprising:
a basket for receiving a load of cotton bolls;
a frame for supporting the basket;
means on the frame for reciprocally moving the basket between an intake position in which the basket rests upright on the frame and a discharge position in which the basket is upended; and
a discharge control apparatus which comprises:
  a discharge control member having a leading edge and being supported in the basket for reciprocal movement between a retracted position and an extended position so that the leading edge of the member follows an eccentrically arced path which generally conforms to the inner contour of the basket; and
  means for controlling the movement of the discharge control member;
wherein the basket has a bottom, an intake side wall and a discharge side wall, and wherein the discharge control member is supported by a link assembly comprising:
  an intake side link having an upper end and a lower end, the lower end being pivotally connected at a fixed point to the basket at the junction of the bottom and the intake side wall;
  a discharge side link having an upper end and a lower end, the lower end being pivotally connected at a fixed point to the basket at the junction of the bottom and the discharge side wall;
  a connecting link having a first end and a second end, the first end being pivotally connected to the upper end of the intake side link and the second end being pivotally connected to the upper end of the discharge side link; and
  a support depending from the connecting link on which the discharge control member is fixed.

6. The cotton cart of claim 5 wherein the bottom, the intake side wall and the discharge side wall of the basket are non-movably related.

7. The cotton cart of the claim 6 wherein the discharge control member is non-movably fixed to the support and the support is non-movably related to the connecting link.

8. The cotton cart of claim 5 wherein the discharge control member is non-movably fixed to the support and the support is non-movably related to the connecting link.

9. A dicharge control apparatus for a container adapted for receiving a load of material, comprising:
a discharge control member having a leading edge and being reciprocally supported within the container for movement between a retracted position and an extended position so that the leading edge of the member follows an eccentrically arced path which generally conforms to the inner contour of the container; and
means for controlling the movement of the discharge control member;
wherein the container has a bottom, an intake side wall and a discharge side wall, and wherein the discharge control member is supported by a link assembly comprising:
  an intake side link having an upper end and a lower end, the lower end being pivotally connected at a fixed point to the basket at the junction of the bottom and the intake side wall;
  a discharge side link having an upper end and a lower end, the lower end being pivotally connected at a fixed point to the basket near the junction of the bottom and the discharge side wall;
  a connecting link having a first end and a second end, the first end being pivotally connected to the upper end of the intake side link and the second end being pivotally connected to the upper end of the discharge side link; and
  a support depending from the connecting link on which the discharge control member is fixed.

10. The discharge control apparatus of claim 1, wherein the bottom, the intake side wall and the discharge side wall of the basket are non-movably related.

11. The discharge control apparatus of claim 10 wherein the discharge control member is non-movably fixed to the support and the support is non-movably related to the connecting link.

12. The discharge control apparatus of claim 9 wherein the discharge control member is non-movably fixed to the support and the support is non-movably related to the connecting link.

* * * * *